US012754740B2

(12) United States Patent
Thunuguntla et al.

(10) Patent No.: US 12,754,740 B2
(45) Date of Patent: Oct. 6, 2026

(54) PARALLEL BOOTSTRAP AND MATERIALIZATION WITH INTELLIGENT RESOLUTION

(71) Applicant: Intuit Inc., Mountain View, CA (US)

(72) Inventors: Saikiran Sri Thunuguntla, Bangalore (IN); Vishal Reddy Baddam, Bangalore (IN); Prashanth Seshadri, Bangalore (IN); Susheel Kiran Javadi, Bangalore (IN)

(73) Assignee: Intuit Inc., Mountain View, CA (US)

( * ) Notice: Subject to any disclaimer, the term of this patent is extended or adjusted under 35 U.S.C. 154(b) by 85 days.

(21) Appl. No.: 18/775,162

(22) Filed: Jul. 17, 2024

(65) Prior Publication Data

US 2026/0023570 A1 Jan. 22, 2026

(51) Int. Cl.

*G06F 15/177* (2006.01)
*G06F 9/00* (2018.01)
*G06F 9/38* (2018.01)
*G06F 9/48* (2006.01)

(52) U.S. Cl.

CPC .......... *G06F 9/3861* (2013.01); *G06F 9/4881* (2013.01)

(58) Field of Classification Search

CPC ............................. G06F 9/3861; G06F 9/4881
See application file for complete search history.

(56) References Cited

U.S. PATENT DOCUMENTS 10,216,820 B1 2/2019 Holenstein et al.
10,459,760 B2 * 10/2019 Scheuer ................ G06F 9/4881
11,023,493 B2 * 6/2021 Xiang ...................... G06F 3/067
2006/0053139 A1 * 3/2006 Marzinski ........... G06F 11/1464
2011/0213923 A1 9/2011 Ledford
2012/0210189 A1 8/2012 Sugihara et al.
2013/0125129 A1 * 5/2013 Chakravorty ......... G06F 9/4843 718/104
2020/0081899 A1 3/2020 Shapur et al.
2020/0364240 A1 11/2020 Martin et al.
2021/0011891 A1 1/2021 Soza
2021/0326359 A1 10/2021 Upton et al.
2022/0012188 A1 * 1/2022 Durham .................. G06F 21/79

(Continued)

FOREIGN PATENT DOCUMENTS

CN 116069864 A 5/2023

*Primary Examiner* — Xuxing Chen
(74) *Attorney, Agent, or Firm* — Paradice & Li LLP

(57) ABSTRACT

Systems and methods for intelligently running jobs in parallel are disclosed. An example method is performed by one or more processors of a job coordination system and includes receiving a transmission over a communications network from a computing device associated with a user of the system, the transmission including a request to perform a bootstrap job on one or more data assets, and the transmission further including a user preference indicating whether the bootstrap job is to be a primary job or a secondary job to a materialization job running in parallel on the one or more data assets, selectively performing one or more preemptive actions based on whether a snapshot for the secondary job would detrimentally overwrite a snapshot for the primary job, and selectively performing one or more remedial actions based on whether the snapshot for the primary job will detrimentally overwrite the snapshot for the secondary job.

20 Claims, 3 Drawing Sheets

300

(56) References Cited

U.S. PATENT DOCUMENTS

| | | | | |
|---|---|---|---|---|
| 2022/0019367 | A1* | 1/2022 | Freilich | G06F 3/067 |
| 2023/0409535 | A1 | 12/2023 | Kashi et al. | |
| 2023/0412375 | A1 | 12/2023 | Bisht et al. | |
| 2024/0004898 | A1 | 1/2024 | Bindal et al. | |
| 2024/0281413 | A1 | 8/2024 | Kashi et al. | |
| 2025/0086180 | A1* | 3/2025 | Kavalakuntla | G06F 16/24549 |
| 2025/0328526 | A1* | 10/2025 | Nandi | G06F 16/24537 |

* cited by examiner

300

PARALLEL BOOTSTRAP AND MATERIALIZATION WITH INTELLIGENT RESOLUTION

CROSS-REFERENCE TO RELATED APPLICATION

This application is related to U.S. patent application Ser. No. 18/775,270 entitled "SELECTIVE MUTUAL EXCLUSIVITY OF BOOTSTRAP AND MATERIALIZATION" and filed on Jul. 17, 2024, which is assigned to the assignee hereof. The disclosures of all prior Applications are considered part of and are incorporated by reference in this Patent Application.

TECHNICAL FIELD

This disclosure relates generally to systems and methods for parallel job processing, and specifically to intelligently running bootstrap jobs and materialization jobs in parallel with intelligent issue prevention and/or resolution.

DESCRIPTION OF RELATED ART

Organizations increasingly rely on accurate data to inform and support data-driven decision-making. As a result, data quality assurance and data management have become increasingly critical tasks. Artificial intelligence (AI)-driven platforms, in particular, require high-quality datasets to enable experts that use these platforms to generate meaningful insights and decisions. However, coordinating data management tasks is even more challenging when multiple data management jobs overlap or conflict, potentially causing inconsistencies and/or confusion about which data source holds the most authoritative information, such as a most recent snapshot.

For example, one data management job type might focus on ensuring that the most up-to-date data is available (such as a materializer job), while another data management job type might prioritize comprehensive data repair up until a particular point in time (such as a bootstrap job). These jobs, while individually valuable, may disrupt each other if allowed to operate without careful coordination. Issues can arise when these jobs need access to shared resources (e.g., a snapshot storage location in a target database), where overwriting the wrong data at the wrong time can lead to severe data integrity consequences for downstream jobs. The result can be a race condition where the correct outcome depends on an unpredictable order in which the jobs are executed and/or completed.

Conventional systems often attempt to resolve such conflicts through scheduling procedures, such as by scheduling bootstrap jobs to run at night and materializer jobs to run during the day. However, this approach can place a heavy burden on manual operations teams and may also lack the flexibility to adapt to changing business needs, particularly as the amount of data and the daily number of jobs increases. Furthermore, as manual intervention is often slow and prone to error, such solutions tend to be less reliable and introduce additional costs and delays as the amount and/or complexity of the data increases. In other words, conventional systems are incapable of making intelligent, context-aware decisions about job prioritization, leading to wasted resources and data inconsistencies.

Without a reliable method for effectively coordinating data management jobs, inefficiencies and data inconsistencies will remain. What is needed is a system that can intelligently coordinate jobs of different types without sacrificing valuable time and flexibility. Furthermore, what is needed is a system that can do so while also enabling the parallel execution of different types of jobs (e.g., bootstrap and materializer jobs), such that organizations can reduce the time needed for such data management tasks, eliminate idle resources during off-peak hours, and dynamically adapt to changing needs, such as data surges and increased scale.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for intelligently running bootstrap jobs and materialization jobs in parallel. An example method is performed by one or more processors of a job coordination system and includes receiving a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets, selectively performing one or more preemptive actions based on whether a snapshot for the secondary job would detrimentally overwrite a snapshot for the primary job, and selectively performing one or more remedial actions based on whether the snapshot for the primary job will detrimentally overwrite the snapshot for the secondary job.

Another innovative aspect of the subject matter described in this disclosure can be implemented in a system for intelligently running bootstrap jobs and materialization jobs in parallel. An example system includes one or more processors and a memory storing instructions for execution by the one or more processors. Execution of the instructions causes the system to perform operations including receiving a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets, selectively performing one or more preemptive actions based on whether a snapshot for the secondary job would detrimentally overwrite a snapshot for the primary job, and selectively performing one or more remedial actions based on whether the snapshot for the primary job will detrimentally overwrite the snapshot for the secondary job.

Another innovative aspect of the subject matter described in this disclosure can be implemented as a non-transitory computer-readable medium storing instructions that, when executed by one or more processors of a system for intelligently running bootstrap jobs and materialization jobs in parallel, cause the system to perform operations. Example operations include receiving a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets, selectively performing one or more preemptive actions based on whether a snapshot for the secondary job would detrimentally overwrite a snapshot for the primary job, and selectively performing one or more remedial actions based on whether the snapshot for the primary job will detrimentally overwrite the snapshot for the secondary job.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
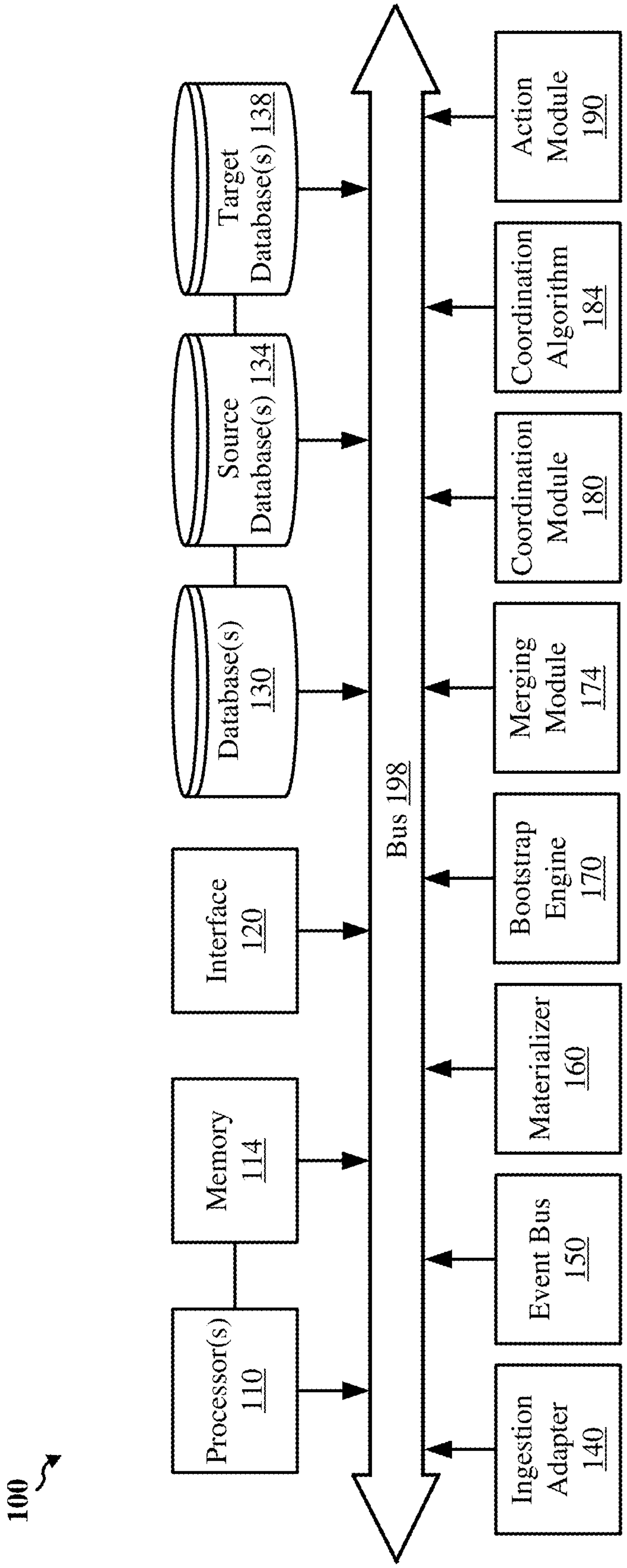
FIG. 1 shows a system, according to some implementations.

As described above, organizations increasingly depend on accurate data for data-based decision making, especially for AI-driven platforms that require high-quality datasets to generate meaningful insights. However, conventional systems lack effective coordination of data management jobs, such as materializer and bootstrap jobs, which often leads to conflicts, inefficiencies, and data inconsistencies. Thus, there is a need for an intelligent system that can coordinate such jobs efficiently and effectively. In addition, there is a need for a system that can do so while also enabling the parallel execution of different jobs with intelligent conflict preemption and/or resolution. Furthermore, as different users have different data needs and uses, an ideal system will determine and adapt its procedures to the preferences of individual users.

For purposes of discussion herein, source data may be stored in source databases that are used for storing data related to various services offered by an organization (e.g., social media, financial management, expert analysis, etc.). The source databases may operate as Online Transaction Processing (OLTP) databases and may constantly be subjected to operations such as inserts, updates, and deletes that are recorded in binary (or "bin") logs. While the source databases are effective for supporting basic user interactions (e.g., in mobile and web platforms), they are not optimized for the analytical purposes of data experts. Thus, various adapters (e.g., ingestion adapters) may extract data from the bin logs, incorporate the extracted data into various event buses (e.g., Kafka-like systems), and perform one or more materialization processes that replicate the source data in one or more target databases (e.g., DataLakes) for expert analytical use. Non-limiting examples of expert analytical use include data queries for purposes of trend analysis to uncover patterns and correlations over time, user and/or customer segmentation for identifying valuable groups based on behavioral and demographic data, predictive analytics for forecasting future trends and behaviors, sentiment analysis to assess user and/or customer attitudes and feedback, and the like. The process of transitioning the source data from its original form in the source databases to its replicated form in the target databases may be referred to as an ingestion process or a merge process, and particular ingestion-based jobs may include materialization jobs, bootstrap jobs, and the like.

For purposes of discussion herein, a materialization job may be for providing the most up-to-date (or "fresh") data to a target database (e.g., a DataLake), such as by bringing in the most recent changes that occurred in the source databases (e.g., since a most recent checkpoint) and merging the changes with corresponding datasets in the target database. After the merge, the materializer job may generate and store a new snapshot table of the updated data in the target database. For example, a snapshot stored in Hadoop Distributed File System (HDFS) format may be a read-only copy of the entire file system at the moment in time that the materializer job was run. In this manner, the snapshot may function as a static baseline representation of the updated data at that time. Typically, certain metadata (e.g., a Hive table metadata location) is then updated to point to the most recent snapshot location. At a subsequent time, changes that occurred since the most recent checkpoint may be ingested, and a subsequent job may generate and store a new snapshot reflecting the most recent changes. The new snapshot includes a new memory location for each file and becomes the new baseline snapshot. This cycle repeats with each job such that each most recent snapshot consistently represents the most up-to-date state of the data. By repeatedly using the latest snapshot, the materializer prevents data duplicates, conflicts, and inconsistencies.

For purposes of discussion herein, a bootstrap job may be for establishing and maintaining the accuracy and quality of data (e.g., by repairing the data) within a target database (e.g., a DataLake), such as when source data is brought into the DataLake for the first time (an initial load), or when there are data issues that need fixing within existing data. In this manner, a bootstrap job can be used to ensure that the DataLake remains consistent and accurate after changes occur in source data, such as data type modifications, encryption requirements for sensitive information, or fixes to missing data caused by source data system errors. In other words, bootstrap jobs are used to ensure that a target database (such as a DataLake) remains reliable and free from quality problems caused by source issues, schema changes, bugs, infrastructure failures, or the like. By addressing these issues, bootstrap jobs enable downstream applications that rely on the DataLake to have access to accurate and trustworthy historical information.

Some organizations may implement and follow various service level agreements (SLAs) that govern the organization's data ingestion practices. The SLAs may function as agreements between data providers and data consumers and establish measurable expectations for the relevant data pipelines. Materializer jobs may generally be tied to SLAs, while bootstrapping jobs generally may not. Example SLA metrics include expectations for data freshness (e.g., how recent of data is available), data accuracy (e.g., how well the data reflects reality), data completeness (e.g., a percentage of data successfully ingested), and data availability (e.g., how consistently the data is accessible). For purposes of discussion herein, materializer jobs may ensure that the data is fresh, and bootstrapping jobs may ensure that the data is accurate. As the duration of bootstrap and materializer jobs can vary, a race condition may arise if a materializer job is also queued for execution at or around the same time that the bootstrap job is requested. Issues can arise in such instances when, for example, a snapshot generated at the end of a bootstrap job overwrites a materializer snapshot, or vice versa. This can lead to subsequent materializer jobs utilizing the data as-fixed by the bootstrap job but lacking any updates that occurred during the most recent materializer job. Alternatively, the fixes implemented by the bootstrap job may be overwritten, thus resulting in data that is fresh but in a potentially erroneous state. In other words, since both materializer jobs and bootstrap jobs access the same data snapshot location, their unpredictable order of completion can lead to either the omission of recent updates or the invalidation of implemented fixes. The innovative job coordination system described herein can effectively avoid and/or efficiently resolve such conflicts based on user preferences, as demonstrated with detailed examples below.

Furthermore, the job coordination system described herein allows for different data management jobs (e.g., materializer and bootstrap jobs) to be run at any time without waiting for the other job to finish, which expedites the completion of such jobs and provides users with overall greater flexibility. Specifically, the job coordination system allows users to choose whether to prioritize data freshness or data accuracy based on their needs. In some example implementations, the job coordination system may cause an SLA to not be met for one or more materializer jobs, such as if an associated user prefers data accuracy over data freshness. In some other example implementations, the job coordination system may force the SLA to be met for one or more materializer jobs and for the data to become eventually accurate over time (i.e., "eventually consistent"), such as if the associated user prefers data freshness over data accuracy. That is, for users who prioritize data accuracy, the job coordination system ensures that the data is accurate even if some data freshness is temporarily delayed, and for users who prioritize data freshness, the job coordination system ensures that the latest updates are provided even if there are some inaccuracies in the historical data that will be eventually corrected. In these and other manners, the job coordination system allows users to choose between always-correct data (which may be slightly less fresh) or always-fresh data (which may temporarily have some historical inaccuracies that will eventually be resolved).

The job coordination system described herein provides several technical benefits over conventional solutions for coordinating data management jobs. As one example, by allowing bootstrap and materializer jobs to run concurrently, the job coordination system can significantly reduce the total time required to complete both tasks, which can be especially beneficial in environments where data is changed frequently and/or needs to be synchronized in near real-time. As another example, by coordinating the parallel execution of different jobs with smart conflict resolution, the job coordination system increases human and machine-based efficiencies, such as by allowing for the most productive use of system resources (e.g., processor and memory), which is particularly beneficial in environments where there are relatively high amounts of data and/or data management jobs. As another example, by intelligently and dynamically pre-empting and/or resolving any conflicts that (could) arise from the simultaneous operation of the jobs, the need for manual intervention is decreased (or eliminated) and the job coordination system enhances the overall integrity of the data, in addition to building user trust in the data synchronization procedures and the insights that are generated using the data. Furthermore, by adapting its conflict resolution procedures based on the data needs of individual users, the job coordination system allows different data management jobs to run in parallel for users on-demand, without any restrictions like waiting periods.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for parallel job processing. Implementations of the subject matter disclosed herein provide specific inventive steps describing how desired results are achieved and realize meaningful and significant improvements on existing computer functionality—that is, the performance of computer-based systems operating in the evolving technological field of parallel job processing.

FIG. 1 shows a system 100, according to some implementations. Various aspects of the system 100 disclosed herein are generally applicable for intelligently running bootstrap jobs and materialization jobs in parallel. The system 100 includes a combination of one or more processors 110, a memory 114 coupled to the one or more processors 110, an interface 120, one or more databases 130, a source database 134, a target database 138, an ingestion adapter 140, an event bus 150, a materializer 160, a bootstrap engine 170, a merging module 174, a coordination module 180, a coordination algorithm 184, and/or an action module 190. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device (e.g., of a user), outputting data (e.g., over the communications network) to the computing device of the user, providing a job request interface for the user, outputting job statuses to the computing device of the user, and the like. In some implementations, the interface 120 is used to receive requests for any one or more of an ingestion process, a materialization process, a bootstrap process, and the like. The interface 120 may also be used to determine a user preference with respect to data freshness or data accuracy, as further described below. The interface 120 may also be used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as source data, target data, data assets, transmissions, requests, preferences, priorities, snapshots, snapshot locations, timestamps, events, algorithms, weights, models, modules, engines, user information, ratios, historical data, recent data, current or real-time data, files, plugins, metadata, arrays, tags, identifiers, prompts, queries, replies, feedback, insights, formats, characteristics, and/or features, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the source database 134, the target database 138, and/or another suitable physical or cloud-based data store. In some implementations, the database 130 includes a relational database capable of presenting information as data sets in tabular form and capable of manipulating the data sets using relational operators.

The one or more source (or "origin") databases 134 store data associated with source (or "origin") data, such as the source data itself, or any other suitable data related to the source data. In some implementations, the source database 134 includes one or more databases that can efficiently handle high-volume, short transactions, including data insertion, updating, and querying, and ensure data integrity and consistency across multi-user environments. In some implementations, the source database 134 includes one or more Online Transaction Processing (OLTP) databases. Example OLTP sources include MySQL, Oracle, Postgres, SQL Server, DynamoDB, S3 Files, SFTP, Domain Events, IPS, Outbox Service, or any other suitable database that can be used for managing high-volume transactions, providing advanced security features, supporting complex queries, enabling data access, securing data transfer, and the like. In various implementations, the source database 134 may be a part of or separate from the database 130 and/or the target database 138. In some instances, the source database 134 includes data stored in one or more cloud object storage services, such as one or more Amazon Web Services (AWS)-based Simple Storage Service (S3) buckets. In some implementations, all or a portion of the data is stored in a memory separate from the source database 134, such as in the database 130 and/or another suitable data store.

The one or more target (or "destination") databases 138 store data associated with target (or "destination") data, such as the target data itself, or any other suitable data related to the target data. In some implementations, the target database 138 includes one or more databases that are ideal for storing vast amounts of historical data that may be used in performing various analytics. For instance, the analytics may include the execution of complex statistical analytical queries submitted by AI expert data analysts. In some implementations, the target database 138 includes one or more DataLakes. To enable fast data retrieval and effective expert analysis of large datasets, the data replicated from the source database 134 is represented in the target database 138 in a columnar format structure, which may incorporate a parquet format in some implementations. In various implementations, the target database 138 may be a part of or separate from the database 130 and/or the source database 134. In some instances, the target database 138 includes data stored in one or more cloud object storage services, such as one or more Amazon Web Services (AWS)-based Simple Storage Service (S3) buckets. In some implementations, all or a portion of the data is stored in a memory separate from the target database 138, such as in the database 130 and/or another suitable data store.

The process of transitioning the source data from its original form in the source database 134 to its replicated form in the target database 138 may be referred to as an ingestion process or a merge process, and particular ingestion-based jobs may include materialization jobs, bootstrap jobs, and the like. The ingestion process may include extracting the source data (e.g., thousands of tables or more) from the source database 134 using one or more adapters (e.g., the ingestion adapter 140) and incorporating the data into one or more event buses (e.g., the event bus 150). In some implementations, the ingestion adapter 140 incorporate one or more aspects of Oracle Golden Gate (OGG) and/or Kafka Connect (KC). In some implementations, the event bus 150 incorporates one or more aspects of change data capture (CDC) to facilitate real-time data integration from the source database 134. Specifically, CDC events may be extracted based on the changes captured from the source database 134 and serialized into a format that includes important information about the associated change, such as a timestamp associated with the change and data before and after the change, and the events may be published to the event bus 150. Following such tasks, subsequent ingestion processes may continue periodically (e.g., by a schedule) and/or by manual initiation.

The materializer 160 may be used to replicate source data from the source database 134 in the target database 138 (e.g., a DataLake). As described above, a materialization job is generally for providing the most up-to-date (or "fresh") data to the target database 138, such as by reading and bringing in the most recent changes (e.g., inserts, updates, and deletes) that occurred in the source database 134 since a most recent checkpoint (e.g., daily, every few hours, or the like) and merging the changes with corresponding datasets in the target database 138. After the merge, the materializer 160 may generate and store a new materializer snapshot (i.e., a point-in-time copy of the associated data assets at an end of the materializer job) of the updated data in the target database 138. In some instances, a dedicated hive table is updated to point to the location of the new snapshot, such as via an "alter table location" command. In some implementations, a materializer job is configured using aspects of Spark. In some aspects, the reading, merging, and generating steps are the most time-consuming steps of the materializer process, while the updating of the new snapshot location may take less than one second.

In an example implementation, a materializer data pipeline may be for real-time processing, where the data is transferred from the event bus 150 to the materializer 160 (e.g., a streaming materializer) and then to a particular target database 138, such as a clean DataLake that stores target data in delta tables to allow immediate access with relatively high data integrity. In another example implementation, a materializer data pipeline may be for cost-effective large-scale analysis and historical reporting, where the data is batched from the event bus 150 to an object storage service (e.g., one or more Amazon S3 buckets), processed by the materializer 160 (e.g., a batch materializer), and stored in a raw DataLake (e.g., in parquet format in hive tables).

The bootstrap engine 170 may be used to replicate source data from the source database 134 in the target database 138 (e.g., the DataLake). As described above, a bootstrap job is generally for establishing and maintaining the accuracy and quality of (e.g., by repairing) data within the target database 138, such as when source data is brought into the DataLake for the first time (an initial load), or when there are data issues that need fixing within existing data. Bootstrapping a DataLake can be done with either a full bootstrap (e.g., where all data in the source database 134 is copied to the target database 138 for initialization or major source data changes) or a partial bootstrap (e.g., focusing on adjustments to specific data subsets to address quality issues within particular time ranges, shards, or primary keys). As a specific example, a table in the source database 134 may be updated to include an email field that suddenly requires encryption or a data type of the table may change in a way that is incompatible with the current state of the DataLake, and in such instances, bootstrapping may be used to bring the DataLake back into alignment with the updated source table.

In some example implementations, the bootstrapping process involves efficiently extracting data from the source database 134 (e.g., in parallel channels), converting the extracted data (e.g., to a columnar Parquet format optimized for DataLakes), loading the converted data directly into the DataLake, and updating the location metadata (e.g., a bootstrap snapshot, i.e., a point-in-time copy of the associated data assets at an end of the bootstrap job) in the DataLake for future accessibility. In some instances, a dedicated hive table is updated to point to the location of the new snapshot, such as via an "alter table location" command. The location of the bootstrap snapshot may be the same as the materializer snapshot described above. For both materializer jobs and bootstrap jobs, default job logic results in a new snapshot being generated when any number of the associated data assets or files (e.g., 100 out of one million) is modified. To prevent duplication issues, the new snapshot will include a new memory location for each file. To note, although certain advancements in modern DataLake technologies (e.g., Delta Lake, Iceberg format, and the like) may offer improved efficiency and manageability, new snapshots will still be generated so as to maintain backward compatibility within the system.

In some implementations, a bootstrap job is configured using aspects of both Java and Spark. For instance, the bootstrap job may be configured to extract the data from the source database 134 in parallel channels using a Java Database Connectivity (JDBC) pull that includes running multiple range (e.g., SQL) queries to retrieve the data from the source database 134 in chunks, locally accumulating the files as intermediate data files, and rewriting the reconciled files to the target database 138 in parquet format using a Spark job. In some aspects, the extracting, converting, and loading steps are the most time-consuming steps of the bootstrapping process, while the updating of the new snapshot location may take less than one second. The time to complete a bootstrap process varies depending on the type (partial or full) and the dataset's size, which can range from a few minutes for partial bootstraps to several hours for full bootstraps on large datasets. In some implementations, the merging module 174 is used in conjunction with the bootstrap engine 170 to merge the bootstrap job with the materialization job for one or more data assets, as further described by example below.

The coordination module 180 may be used in conjunction with the coordination algorithm 184 to actively coordinate the running of different data management jobs (e.g., bootstrap and materialization jobs) in parallel. Additionally, the coordination module 180 may be used in conjunction with the coordination algorithm 184 to selectively initiate the performance of various actions based on whether a snapshot for one of the jobs would detrimentally overwrite a snapshot for the other. The various actions may include preemptive and/or remedial actions, where preemptive actions are performed to proactively anticipate and/or prevent potential data issues from occurring, while remedial actions are performed to reactively address and/or mitigate data issues that have occurred. Thereafter, the action module 190 may be used to selectively perform the initiated actions.

As a non-limiting example, the job coordination system may receive (e.g., via the interface 120) a transmission from a computing device associated with a user of the job coordination system. The transmission may include a request to perform a job on one or more data assets selected by the user. For example, the user may be requesting that the job coordination system perform a bootstrap job on the one or more data assets. The user may also indicate (e.g., by selecting an option presented to the user via the interface 120) a preference for the job to prioritize a particular data quality. For example, the user may indicate whether the bootstrap job is to prioritize "data accuracy" or "data freshness". In this manner, the job coordination system determines whether the bootstrap job is to be a primary job (i.e., when "data accuracy" is the priority) or a secondary job (i.e., when "data freshness" is the priority). If another job (e.g., a materialization job) is running in parallel on the one or more data assets or is scheduled to run at a time relatively near (before or after) the time of the user's bootstrap request, the job coordination system will determine that the materialization job is a secondary job if the bootstrap job is the primary job, and vice versa. In some implementations not shown, the job coordination system intelligently determines whether the requested job is to be the primary or secondary job based on factors such as metadata related to deadlines or potential job impacts, job dependencies, available storage and/or processing resources, predicted run times, job success and/or failure rates, a role of the user submitting the request, a custom set of weights, or the like. In some other implementations not shown, the requested job (e.g., bootstrap job) is initiated based on a schedule or a dynamic determination of a need for the job, rather than a manual user request. For example, the job coordination system may automatically determine a need for a bootstrap job based on a new data source being integrated into the target database 138, based on detecting a significant change (e.g., in schema, columns, data types, fields, etc.) in the source database 134, based on detecting that a critical job has failed, or the like.

Upon determining whether the bootstrap job is the primary or the secondary job, the coordination module 180 may be used to determine whether a snapshot for the secondary job ("secondary snapshot") would detrimentally overwrite a snapshot for the primary job ("primary snapshot") absent the performance of one or more preemptive actions. The coordination module 180 may make such determinations based on metadata that the coordination module 180 retrieves from a metadata table associated with the jobs, as further described by examples below. In some aspects, the metadata table is stored in the target database 138 and is automatically updated with an entry including details for each respective job run, such as a time that the respective job was requested, a time that the respective job was run, a time that the respective job finished, a location of a snapshot generated after the respective job, a status of the respective job, a user preference (e.g., "data accuracy" or "data freshness") associated with the respective job, a hive table location associated with the respective job, a type of the respective job, or the like.

In a first example, the user preference is "data accuracy" (i.e., the primary job is the bootstrap job and the secondary job is the materializer job), and the metadata indicates that the bootstrap job starts at 11 am and ends at 12 pm and that the materializer job starts at 12:15 pm and ends at 1 pm (i.e., the bootstrap job starts and finishes before the materializer job starts). For this example, the snapshot for the bootstrap job will be stored (e.g., overwriting the previous materializer's snapshot) and used by data consumers from 12 pm until 1 pm, the materializer job will use the stored bootstrap snapshot as its baseline (e.g., rather than the previous materializer's snapshot), and the snapshot for the materializer job will be stored (e.g., overwriting the bootstrap's snapshot) and used at and after 1 pm. As there is no overlap between the primary (bootstrap) job and the secondary (materializer) job, the coordination module 180 determines that the secondary snapshot will not detrimentally overwrite the primary snapshot, and thus refrains from initiating any preemptive actions. To note, although the materializer snapshot will indeed overwrite the bootstrap snapshot for this example, the coordination module 180 determines that any repairs affected by the bootstrap job are carried over into the materializer snapshot because the materializer job uses the bootstrap snapshot as its baseline—thus, data accuracy (the user's preference) is maintained, i.e., there is no detriment.

If, for the first example, the user preference is "data freshness" (i.e., the primary job is the materializer job and the secondary job is the bootstrap job), again, as there is no overlap between the primary (materializer) job and the secondary (bootstrap) job, the coordination module 180 determines that the secondary snapshot will not overwrite the primary snapshot (detrimentally, or otherwise), and thus refrains from initiating any preemptive actions.

In a second example, the user preference is "data accuracy" (i.e., the primary job is the bootstrap job and the secondary job is the materializer job), and the metadata indicates that the materializer job starts at 12:15 pm and ends at 1 pm and that the bootstrap job starts at 1:15 pm and ends at 2 pm (i.e., the materializer job starts and finishes before the bootstrap job starts). For this example, the snapshot for the materializer job will be used from 1 pm until 2 pm, the bootstrap job will use the stored materializer snapshot as its baseline, and the snapshot for the bootstrap job will be stored (e.g., overwriting the materializer's snapshot) and used at and after 2 pm. As there is no overlap between the primary (bootstrap) job and the secondary (materializer) job, the coordination module 180 determines that the secondary snapshot will not overwrite the primary snapshot (detrimentally, or otherwise), and thus refrains from initiating any preemptive actions.

If, for the second example, the user preference is "data freshness" (i.e., the primary job is the materializer job and the secondary job is the bootstrap job), again, as there is no overlap between the primary (materializer) job and the secondary (bootstrap) job, the coordination module 180 determines that the secondary snapshot will not detrimentally overwrite the primary snapshot, and thus refrains from initiating any preemptive actions.

In a third example, the user preference is "data accuracy" (i.e., the primary job is the bootstrap job and the secondary job is the materializer job), and the metadata indicates that the bootstrap job starts at 11 am and ends at 12:30 pm and that the materializer job starts at 12:15 pm and ends at 1 pm (i.e., the materializer job starts during the bootstrap job and finishes after the bootstrap job ends). For this example, the bootstrap snapshot is stored at 12:30 pm; however, the materializer job does not use the bootstrap snapshot as its checkpoint because the materializer job starts before the bootstrap job finishes. Thus, if the materializer job is allowed to overwrite the bootstrap snapshot at 1 pm, any fixes that were affected during the bootstrap job would not be carried over—in other words, the secondary job would detrimentally overwrite a snapshot for the primary job. As the user preference is "data accuracy," losing the fixes affected by the bootstrap job would be greatly detrimental; thus, the coordination module 180 may initiate one or more preemptive actions to prevent the materializer snapshot from overwriting the bootstrap snapshot at 1 pm. For this example, the preemptive actions may include refraining or otherwise preventing the update of the snapshot location associated with the materialization job. To accomplish this, in some implementations, the coordination module 180 ensures that the materializer job includes a verification step that checks for certain conditions (e.g., in the metadata table described above) before updating the snapshot location. For instance, the verification step may determine whether (a) a bootstrap snapshot was stored during the materializer run, (b) the user preference is "data accuracy," and (c) the current materializer job did not use the stored bootstrap snapshot as its checkpoint, and if all of (a)-(c) are true, the materializer 160 may be prevented from updating the snapshot location at the end of its job (e.g., at 1 pm for this example). In this manner, the secondary job is prevented from detrimentally overwriting a snapshot for the primary job. To note, although this advantageously preserves "data accuracy," in some implementations, the coordination module 180 may initiate additional actions to additionally preserve "data freshness." For this example, the additional preemptive actions may include initiating an additional materializer job including custom parameters causing the additional materializer job to use the bootstrap snapshot as its baseline, thus overriding the default logic of the materializer 160. For instance, the additional materializer job may be an ad-hoc batch processing pipeline (BPP) job (e.g., initiated by an API call) that materializes only the one or more data assets associated with the bootstrap job (e.g., as determined using the metadata table). Thereafter, the snapshot location may be updated based on the additional materializer job. To note, although the additional materializer job's snapshot will overwrite the bootstrap snapshot, the repairs affected by the bootstrap job are carried over into the additional materializer job's snapshot because the additional materializer job uses the bootstrap snapshot as its baseline—thus, data accuracy (the user's preference) is maintained.

In a fourth example, the user preference is "data accuracy" (i.e., the primary job is the bootstrap job and the secondary job is the materializer job), and the metadata indicates that the bootstrap job starts at 1 pm and ends at 1:30 pm and that the materializer job starts at 12:15 pm and ends at 2 pm (i.e., the bootstrap job starts and finishes during the materializer job). For this example, the bootstrap snapshot is stored at 1:30 pm; however, the materializer job does not use the bootstrap snapshot as its checkpoint because the materializer job starts before the bootstrap job finishes. Thus, if the materializer job is allowed to overwrite the bootstrap snapshot at 2 pm, any fixes that were affected during the bootstrap job would not be carried over—in other words, the secondary job would detrimentally overwrite a snapshot for the primary job. As the user preference is "data accuracy," losing the fixes affected by the bootstrap job would be greatly detrimental; thus, the coordination module 180 may initiate one or more preemptive actions to prevent the materializer snapshot from overwriting the bootstrap snapshot at 2 pm. For this example, the preemptive actions may again include refraining or otherwise preventing the update of the snapshot location associated with the materialization job using the verification step described above. That is, since (a) a bootstrap snapshot is stored during the materializer run, (b) the user preference is "data accuracy," and (c) the current materializer job does not use the stored bootstrap snapshot as its checkpoint, the materializer 160 is prevented from updating the snapshot location at the end of its job (e.g., at 2 pm for this example). Accordingly, the secondary job is prevented from detrimentally overwriting a snapshot for the primary job. In some implementations, the coordination module 180 may also initiate one or more additional actions to additionally preserve "data freshness," similar to that as described with respect to the third example above, e.g., running an additional materializer job using the bootstrap job as its baseline.

In a fifth example, the user preference is "data freshness" (i.e., the primary job is the materializer job and the secondary job is the bootstrap job), and the metadata indicates that the bootstrap job starts at 11 am and ends at 1:30 pm and that the materializer job starts at 12:15 pm and ends at 1 pm (i.e., the materializer job starts and finishes during the bootstrap job). For this example, the materializer snapshot is stored at 1 pm; however, the bootstrap job does not use the materializer snapshot as its checkpoint because the bootstrap job starts before the materializer job finishes. Thus, if the bootstrap job is allowed to overwrite the materializer snapshot at 1:30 pm, any updates that were affected during the materializer job would not be carried over—in other words, the secondary job would detrimentally overwrite a snapshot for the primary job. For this example, because the start time of the bootstrap job is before the start time of the materialization job, the coordination module 180 may determine that the secondary job would detrimentally overwrite the snapshot for the primary job. Specifically, if the materializer job is associated with an SLA that promises a data freshness time of 12:15 pm, overwriting the materializer snapshot with a bootstrap snapshot that is only current until 11 am would violate the SLA. As violating the SLA would be greatly detrimental for this example, the coordination module 180 may initiate one or more preemptive actions to prevent the bootstrap snapshot from overwriting the materializer snapshot at 1:30 pm. For this example, the preemptive actions may include refraining or otherwise preventing the update of the snapshot location associated with the bootstrap job. To accomplish this, in some implementations, the coordination module 180 ensures that the bootstrap job includes a verification step that checks for certain conditions (e.g., in the metadata table described above) before updating the snapshot location. For instance, the verification step may determine whether (a) a materializer snapshot was stored during the bootstrap run, (b) the user preference is "data freshness," and (c) the current bootstrap job did not use the stored materializer snapshot as its checkpoint, and if all of (a)-(c) are true, the bootstrap engine 170 may be prevented from updating the snapshot location at the end of its job (e.g., at 1:30 pm for this example). In this manner, the secondary job is prevented from detrimentally overwriting a snapshot for the primary job.

To note, although this advantageously preserves "data freshness," in some implementations, the coordination module 180 may initiate additional actions to additionally preserve "data accuracy." For this example, the additional preemptive actions may include initiating an additional bootstrap job including custom parameters that override the default logic of the bootstrap engine 170. In some instances, the custom parameters cause the additional bootstrap job to merge (e.g., using the merging module 174) the latest bootstrap snapshot with the updates affected (e.g., to the associated data assets) by the materializer job between the time that the most recent bootstrap job started (e.g., 11 am for this example) and the time that the most recent materializer job started (e.g., 12:15 pm for this example). In this manner, the bootstrap snapshot is updated to incorporate the latest updates until the time promised by the SLA associated with the materializer job. Thereafter, the snapshot location may be updated based on the additional bootstrap job. Although the additional bootstrap job's snapshot will overwrite the materializer snapshot, the updates affected by the materializer job are carried over into the additional bootstrap job's snapshot in the manners described above-thus, data freshness (the user's preference) is maintained.

In a sixth example, the user preference is "data freshness" (i.e., the primary job is the materializer job and the secondary job is the bootstrap job), and the metadata indicates that the bootstrap job starts at 1 pm and ends at 1:30 pm and that the materializer job starts at 12:15 pm and ends at 1:15 pm (i.e., the bootstrap job starts during the materializer job and finishes after the materializer job finishes). For this example, the materializer snapshot is stored at 1:15 pm; however, the bootstrap job does not use the materializer snapshot as its checkpoint because the bootstrap job starts before the materializer job finishes. Thus, if the bootstrap job is allowed to overwrite the materializer snapshot at 1:30 pm, any updates that were affected during the materializer job would not be carried over. However, for this example, because the start time of the bootstrap job is after the start time of the materialization job, the coordination module 180 may determine that the secondary job will not detrimentally overwrite the snapshot for the primary job. For instance, the materializer job may be associated with an SLA that promises a data freshness time of 12:15 pm, and overwriting the materializer snapshot with a bootstrap snapshot that is current until 1 pm would honor the SLA in addition to advantageously increasing the freshness of the data beyond the time promised by the SLA. Thus, although the bootstrap snapshot will indeed overwrite the materializer snapshot for this example, the coordination module 180 determines that the secondary job will not detrimentally overwrite the snapshot for the primary job, and thus, refrains from initiating the performance of the preemptive actions.

The coordination module 180 may also be used to determine whether to initiate one or more remedial actions, such as when the secondary snapshot detrimentally overwrites the primary snapshot. For instance, in another implementation of the fifth example above, the user preference may instead be "data accuracy" (i.e., the primary job is the bootstrap job and the secondary job is the materializer job). As mentioned above, because the bootstrap job does not use the materializer snapshot as its checkpoint and finishes after the materializer job, absent preemptive actions, the bootstrap job will overwrite the materializer snapshot at 1:30 pm. However, as the user preference is "data accuracy" for this example, the coordination module 180 may determine that overwriting the updates affected by the latest materializer job is not a detriment. Thus, the coordination module 180 may also refrain from initiating the performance of any remedial actions. With reference to the verification step described above, although the (a) and (c) conditions are met, the (b) condition is not, and thus the coordination module 180 may not prevent the bootstrap engine 170 from updating the snapshot location at the end of its job (e.g., at 1:30 pm for this example). In some implementations, the coordination module 180 refrains from initiating the performance of remedial actions when the secondary job is the materialization job, opting to allow the system to become eventually consistent after a subsequently scheduled materializer job. In some implementations not shown, the coordination module 180 may instead initiate an additional bootstrap job that incorporates the relevant changes affected by the materializer job, such as if it is desired to maintain data accuracy and data freshness without waiting for a subsequently scheduled materializer job. Similarly, in another implementation of the sixth example above, when the user preference is instead "data accuracy," absent preemptive actions, the bootstrap job will overwrite the materializer snapshot at 1:30 pm. However, again, as the user preference is "data accuracy" for this example, the coordination module 180 may determine that overwriting the updates affected by the latest materializer job is not a detriment and may thus also refrain from initiating the performance of remedial actions. Again referring to the verification step described above, the (a) and (c) conditions are met, but the (b) condition is not, and thus the coordination module 180 will not prevent the bootstrap engine 170 from updating the snapshot location at the end of its job.

In contrast, in another implementation of the third example above, the user preference may instead be "data freshness" (i.e., the primary job is the materializer job and the secondary job is the bootstrap job). As mentioned above, the materializer job does not use the bootstrap snapshot as its checkpoint because the materializer job starts before the bootstrap job finishes, and thus, absent preemptive actions, the materializer job overwrites the bootstrap snapshot at 1 pm. As the user preference is "data freshness" for this example, the coordination module 180 may determine that overwriting any fixes affected by the latest bootstrap job is not detrimental enough to warrant preemptive actions. However, as it could be detrimental (e.g., for other users) for the fixes to remain undone, the coordination module 180 may initiate one or more remedial actions to ensure that the fixes are eventually re-affected. Thus, for this example, the coordination module 180 may allow the materialization job to update the snapshot location at 1 pm (i.e., overwriting the bootstrap snapshot), and then initiate the performance of remedial actions including triggering an additional materialization job for the associated data assets, where the additional materialization job incorporates the bootstrap snapshot, and then again updating the snapshot location after the additional materialization job. Similarly, in another implementation of the fourth example above, when the user preference is instead "data freshness," absent preemptive actions, the materializer job will overwrite the bootstrap snapshot at 2 pm. However, again, as the user preference is "data freshness" for this example, the coordination module 180 may determine that overwriting the fixes affected by the latest bootstrap job is not detrimental enough to warrant preemptive actions and thus refrain from preventing the materializer job from updating the snapshot location, for example. However, again, the coordination module 180 may instead initiate remedial actions to ensure that the fixes are eventually re-affected, such as by triggering an additional materialization job incorporating the bootstrap snapshot and updating the snapshot location after the additional materialization job.

The ingestion adapter 140, the event bus 150, the materializer 160, the bootstrap engine 170, the merging module 174, the coordination module 180, the coordination algorithm 184, and/or the action module 190 are implemented in software, hardware, or a combination thereof. In some implementations, any one or more of the ingestion adapter 140, the event bus 150, the materializer 160, the bootstrap engine 170, the merging module 174, the coordination module 180, the coordination algorithm 184, or the action module 190 is embodied in instructions that, when executed by the processor 110, cause the system 100 to perform operations. In various implementations, the instructions of one or more of said components, the interface 120, the source database 134, and/or target database 138, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to intelligently running bootstrap jobs and materialization jobs in parallel are described with reference to the system 100, other suitable system configurations may be used.

Figure 2:
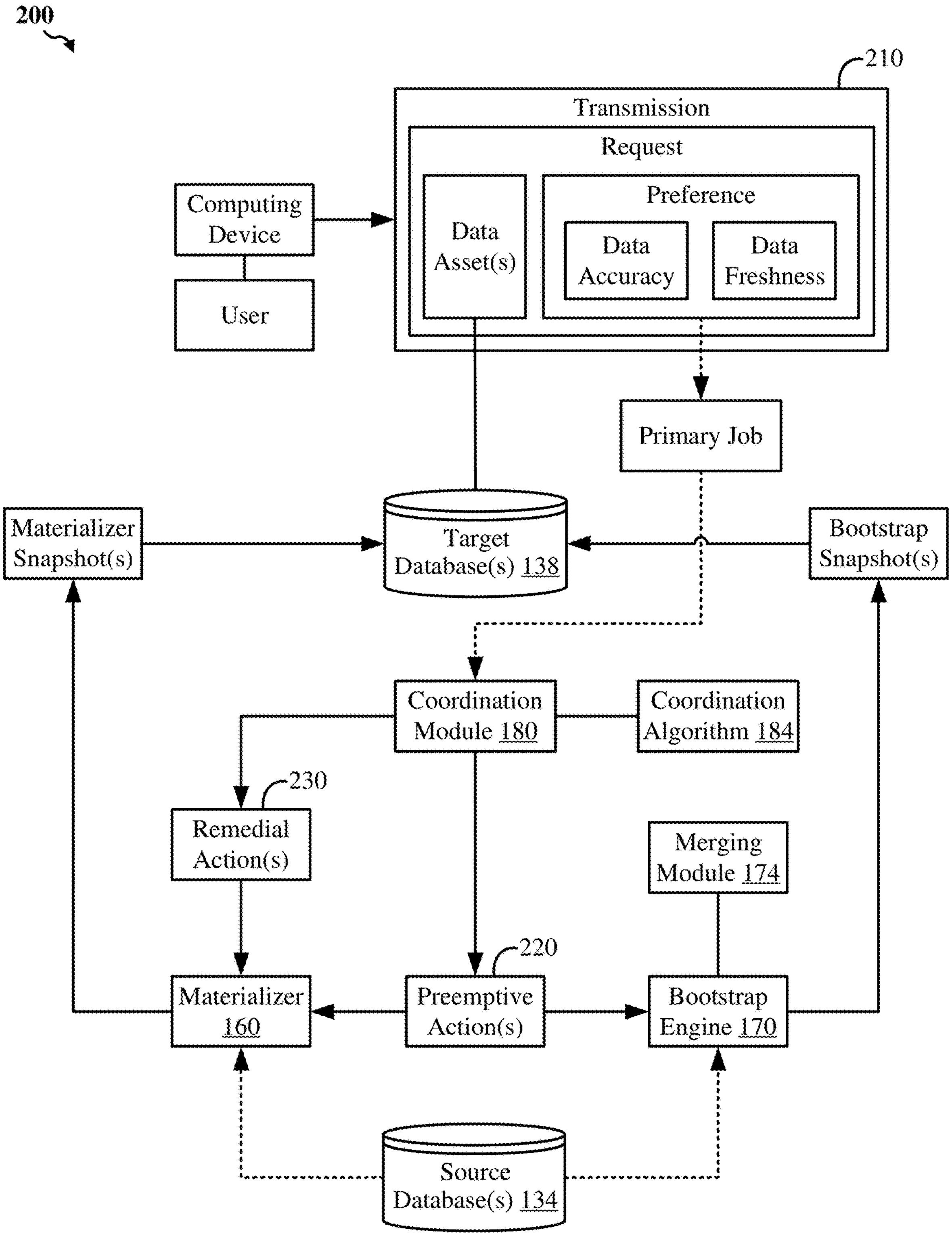
FIG. 2 shows a high-level overview of an example process flow employed by a system, according to some implementations.

FIG. 2 shows a high-level overview of an example process flow 200 employed by a system, according to some implementations, during which bootstrap jobs and materialization jobs are intelligently run in parallel. In various implementations, the system is a job coordination system and incorporates one or more (or all) aspects of the system 100. In some implementations, various aspects described with respect to FIG. 1 are not incorporated, such as the source database 134, the target database 138, the ingestion adapter 140, the event bus 150, the materializer 160, the bootstrap engine 170, the merging module 174, and/or the action module 190. For instance, in some implementations, the coordination module 180 in conjunction with the coordination algorithm 184 intelligently determines which, if any, preemptive and/or remedial actions to perform and transmits instructions initiating the performance of such actions.

At block 210, a transmission is received (e.g., via the interface 120) over a communications network from a computing device associated with a user of the system 100. The transmission may include a request to perform a bootstrap job on one or more data assets (e.g., stored in the target database 138). The transmission may further include a preference of the user indicating whether the bootstrap job is to be a primary job or a secondary job to a materialization job running in parallel on the one or more data assets. In some implementations, the user preference indicates whether the system 100 is to prioritize data accuracy or data freshness. In such implementations, the system 100 may determine that the bootstrap job is the primary job (and thus that the materialization job is the secondary job) when data accuracy is the priority, and alternatively, the system 100 may determine that the materialization job is the primary job (and thus that the bootstrap job is the secondary job) when data freshness is the priority. The materialization job may be performed by the materializer 160, and the bootstrap job may be performed by the bootstrap engine 170. In some implementations, the jobs are associated with the ingestion of data from the source database 134 to the target database 138, which may include operations performed by one or more components not shown for simplicity, such as one or more ingestion adapters (e.g., the ingestion adapter 140) and/or one or more event buses (e.g., the event bus 150). In some instances, the one or more source databases 134 include at least one Online Transaction Processing (OLTP) database. In some other instances, the one or more target databases 138 include at least one DataLake.

At block 220, the coordination module 180 selectively performs one or more preemptive actions based at least in part on whether a snapshot for the secondary job would detrimentally overwrite a snapshot for the primary job. In some aspects, each snapshot is a point-in-time copy of the associated data assets at an end of the respective job. In some implementations, the selective performance of the one or more preemptive actions includes performing the preemptive actions responsive to determining that the primary job is the bootstrap job and that the materialization snapshot would detrimentally overwrite the bootstrap snapshot. For instance, such preemptive actions may include refraining from updating a snapshot location associated with the materialization job, triggering an additional materialization job for the one or more data assets (where the additional materialization job incorporates the bootstrap snapshot), and updating the snapshot location after the additional materialization job. In some implementations, the selective performance of the one or more preemptive actions includes refraining from performing the preemptive actions responsive to determining that the primary job is the bootstrap job and that the materialization snapshot will not detrimentally overwrite the bootstrap snapshot. In some implementations, the selective performance of the one or more preemptive actions includes performing the preemptive actions responsive to determining that the primary job is the materialization job, that the bootstrap snapshot would detrimentally overwrite the materialization snapshot, and that a start time of the bootstrap job is before a start time of the materialization job. For instance, such preemptive actions may include refraining from updating a snapshot location associated with the bootstrap job, merging the bootstrap job with the materialization job for the one or more data assets, triggering an additional bootstrap job for the one or more data assets (where the additional bootstrap job incorporates the merged bootstrap and materialization job), and updating the snapshot location after the additional bootstrap job. In some implementations, the selective performance of the one or more preemptive actions includes refraining from performing the preemptive actions responsive to determining that the primary job is the materialization job and that the bootstrap snapshot will not detrimentally overwrite the materialization snapshot. In some other implementations, the selective performance of the one or more preemptive actions includes refraining from performing the preemptive actions responsive to determining that the primary job is the materialization job and that the start time of the bootstrap job is after the start time of the materialization job.

At block 230, the coordination module 180 selectively performs one or more remedial actions based at least in part on whether the snapshot for the primary job will detrimentally overwrite the snapshot for the secondary job. In some implementations, the selective performance of the one or more remedial actions includes refraining from performing the remedial actions responsive to determining that the secondary job is the materialization job. In some implementations, the selective performance of the one or more remedial actions includes performing the remedial actions responsive to determining that the secondary job is the bootstrap job and that the materialization snapshot will detrimentally overwrite the bootstrap snapshot. For instance, such remedial actions may include updating a snapshot location associated with the materialization job, triggering an additional materialization job for the one or more data assets (where the additional materialization job incorporates the bootstrap snapshot), and updating the snapshot location after the additional materialization job. In some implementations, the selective performance of the one or more remedial actions includes refraining from performing the remedial actions responsive to determining that the secondary job is the bootstrap job and that the materialization snapshot will not detrimentally overwrite the bootstrap snapshot.

Figure 3:
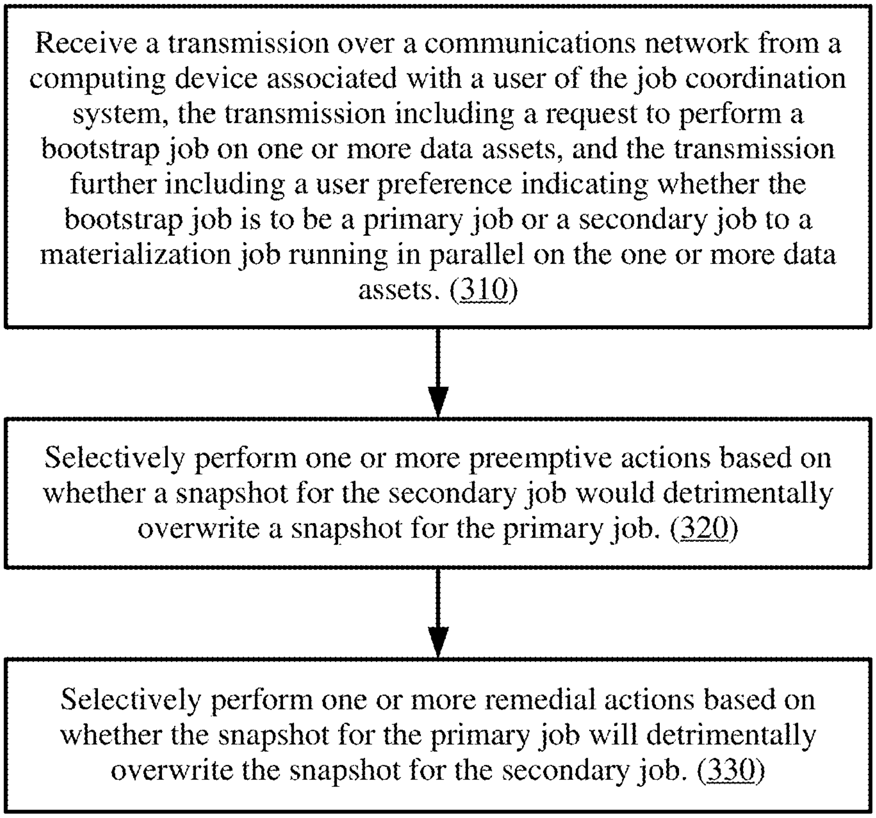
FIG. 3 shows an illustrative flowchart depicting an example operation for intelligently running bootstrap jobs and materialization jobs in parallel, according to some implementations.

FIG. 3 shows a high-level overview of an example process flow 300 employed by the system 100 of FIG. 1 and/or the system described with respect to FIGS. 2, according to some implementations, during which bootstrap jobs and materialization jobs are intelligently run in parallel. At block 310, the system 100 receives a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets. At block 320, the system 100 selectively performs one or more preemptive actions based on whether a snapshot for the secondary job would detrimentally overwrite a snapshot for the primary job. At block 330, the system 100 selectively performs one or more remedial actions based on whether the snapshot for the primary job will detrimentally overwrite the snapshot for the secondary job.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for intelligently running bootstrap jobs and materialization jobs in parallel, the method performed by one or more processors of a job coordination system and comprising:

receiving a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets;

selectively performing one or more preemptive actions based on whether a snapshot for the secondary job would overwrite a snapshot for the primary job such that one or more fixes or updates implemented during the primary job are not incorporated; and selectively performing one or more remedial actions based on whether the snapshot for the primary job will overwrite the snapshot for the secondary job such that one or more fixes or updates implemented during the secondary job are not incorporated.

2. The method of claim 1, wherein the user preference indicates whether the job coordination system is to prioritize data accuracy or data freshness, wherein the bootstrap job is the primary job and the materialization job is the secondary job when the job coordination system is to prioritize data accuracy, and wherein the materialization job is the primary job and the bootstrap job is the secondary job when the job coordination system is to prioritize data freshness.

3. The method of claim 1, wherein each snapshot is a point-in-time copy of the associated data assets at an end of the respective job.

4. The method of claim 1, the selective performance of the one or more preemptive actions including:

performing the preemptive actions responsive to determining that the primary job is the bootstrap job and that the materialization snapshot would overwrite the bootstrap snapshot such that one or more fixes or updates implemented during the bootstrap job are not incorporated; and refraining from performing the preemptive actions responsive to determining that the primary job is the bootstrap job and that the materialization snapshot will not overwrite the bootstrap snapshot such that one or more fixes or updates implemented during the bootstrap job are not incorporated.

5. The method of claim 4, wherein the preemptive actions performed responsive to determining that the primary job is the bootstrap job and that the materialization snapshot would overwrite the bootstrap snapshot such that one or more fixes or updates implemented during the bootstrap job are not incorporated include:

refraining from updating a snapshot location associated with the materialization job;

triggering an additional materialization job for the one or more data assets, the additional materialization job incorporating the bootstrap snapshot; and updating the snapshot location after the additional materialization job.

6. The method of claim 1, the selective performance of the one or more preemptive actions including:

performing the preemptive actions responsive to determining that the primary job is the materialization job, that the bootstrap snapshot would overwrite the materialization snapshot such that one or more fixes or updates implemented during the materialization job are not incorporated, and that a start time of the bootstrap job is before a start time of the materialization job; and refraining from performing the preemptive actions responsive to determining that the primary job is the materialization job and that the bootstrap snapshot will not overwrite the materialization snapshot such that one or more fixes or updates implemented during the materialization job are not incorporated or that the start time of the bootstrap job is after the start time of the materialization job.

7. The method of claim 6, wherein the preemptive actions performed responsive to determining that the primary job is the materialization job, that the bootstrap snapshot would overwrite the materialization snapshot such that one or more fixes or updates implemented during the materialization job are not incorporated, and that the start time of the bootstrap job is before the start time of the materialization job include:

refraining from updating a snapshot location associated with the bootstrap job;

merging the bootstrap job with the materialization job for the one or more data assets;

triggering an additional bootstrap job for the one or more data assets, the additional bootstrap job incorporating the merged bootstrap and materialization job; and updating the snapshot location after the additional bootstrap job.

8. The method of claim 1, the selective performance of the one or more remedial actions including:

refraining from performing the remedial actions responsive to determining that the secondary job is the materialization job.

9. The method of claim 1, the selective performance of the one or more remedial actions including:

performing the remedial actions responsive to determining that the secondary job is the bootstrap job and that the materialization snapshot will overwrite the bootstrap snapshot such that one or more fixes or updates implemented during the bootstrap job are not incorporated; and refraining from performing the remedial actions responsive to determining that the secondary job is the bootstrap job and that the materialization snapshot will not overwrite the bootstrap snapshot such that one or more fixes or updates implemented during the bootstrap job are not incorporated.

10. The method of claim 9, wherein the remedial actions performed responsive to determining that the secondary job is the bootstrap job and that the materialization snapshot will overwrite the bootstrap snapshot such that one or more fixes or updates implemented during the bootstrap job are not incorporated include:

updating a snapshot location associated with the materialization job;

triggering an additional materialization job for the one or more data assets, the additional materialization job incorporating the bootstrap snapshot; and updating the snapshot location after the additional materialization job.

11. A system for intelligently running bootstrap jobs and materialization jobs in parallel, the system comprising:

one or more processors; and at least one memory coupled to the one or more processors and storing instructions that, when executed by the one or more processors, cause the system to perform operations including:

receiving a transmission over a communications network from a computing device associated with a user of the job coordination system, the transmission including a request to perform a bootstrap job on one or more data assets, and the transmission further including a user preference indicating whether the bootstrap job is to be a primary job or a secondary job to a materialization job running in parallel on the one or more data assets;

selectively performing one or more preemptive actions based on whether a snapshot for the secondary job would overwrite a snapshot for the primary job such that one or more fixes or updates implemented during the primary job are not incorporated; and selectively performing one or more remedial actions based on whether the snapshot for the primary job will overwrite the snapshot for the secondary job such that one or more fixes or updates implemented during the secondary job are not incorporated.

12. The system of claim 11, wherein the user preference indicates whether the job coordination system is to prioritize data accuracy or data freshness, wherein the bootstrap job is the primary job and the materialization job is the secondary job when the job coordination system is to prioritize data accuracy, and wherein the materialization job is the primary job and the bootstrap job is the secondary job when the job coordination system is to prioritize data freshness.

13. The system of claim 11, wherein each snapshot is a point-in-time copy of the associated data assets at an end of the respective job.

14. The system of claim 11, the selective performance of the one or more preemptive actions including:

performing the preemptive actions responsive to determining that the primary job is the bootstrap job and that the materialization snapshot would overwrite the bootstrap snapshot such that one or more fixes or updates implemented during the bootstrap job are not incorporated; and refraining from performing the preemptive actions responsive to determining that the primary job is the bootstrap job and that the materialization snapshot will not overwrite the bootstrap snapshot such that one or more fixes or updates implemented during the bootstrap job are not incorporated.

15. The system of claim 14, wherein the preemptive actions performed responsive to determining that the primary job is the bootstrap job and that the materialization snapshot would overwrite the bootstrap snapshot such that one or more fixes or updates implemented during the bootstrap job are not incorporated include:

refraining from updating a snapshot location associated with the materialization job;

triggering an additional materialization job for the one or more data assets, the additional materialization job incorporating the bootstrap snapshot; and updating the snapshot location after the additional materialization job.

16. The system of claim 11, the selective performance of the one or more preemptive actions including:

performing the preemptive actions responsive to determining that the primary job is the materialization job, that the bootstrap snapshot would overwrite the materialization snapshot such that one or more fixes or updates implemented during the materialization job are not incorporated, and that a start time of the bootstrap job is before a start time of the materialization job; and refraining from performing the preemptive actions responsive to determining that the primary job is the materialization job and that the bootstrap snapshot will not overwrite the materialization snapshot such that one or more fixes or updates implemented during the materialization job are not incorporated or that the start time of the bootstrap job is after the start time of the materialization job.

17. The system of claim 16, wherein the preemptive actions performed responsive to determining that the primary job is the materialization job, that the bootstrap snapshot would overwrite the materialization snapshot such that one or more fixes or updates implemented during the materialization job are not incorporated, and that the start time of the bootstrap job is before the start time of the materialization job include:

refraining from updating a snapshot location associated with the bootstrap job;

merging the bootstrap job with the materialization job for the one or more data assets;

triggering an additional bootstrap job for the one or more data assets, the additional bootstrap job incorporating the merged bootstrap and materialization job; and updating the snapshot location after the additional bootstrap job.

18. The system of claim 11, the selective performance of the one or more remedial actions including:

refraining from performing the remedial actions responsive to determining that the secondary job is the materialization job.

19. The system of claim 11, the selective performance of the one or more remedial actions including:

performing the remedial actions responsive to determining that the secondary job is the bootstrap job and that the materialization snapshot will overwrite the bootstrap snapshot such that one or more fixes or updates implemented during the bootstrap job are not incorporated; and refraining from performing the remedial actions responsive to determining that the secondary job is the bootstrap job and that the materialization snapshot will not overwrite the bootstrap snapshot such that one or more fixes or updates implemented during the bootstrap job are not incorporated.

20. The system of claim 19, wherein the remedial actions performed responsive to determining that the secondary job is the bootstrap job and that the materialization snapshot will overwrite the bootstrap snapshot such that one or more fixes or updates implemented during the bootstrap job are not incorporated include:

updating a snapshot location associated with the materialization job;

triggering an additional materialization job for the one or more data assets, the additional materialization job incorporating the bootstrap snapshot; and updating the snapshot location after the additional materialization job.

* * * * *